(12) United States Patent
Sakamoto et al.

(10) Patent No.: US 7,939,976 B2
(45) Date of Patent: May 10, 2011

(54) HYBRID TYPE ROTARY ELECTRIC MACHINE

(75) Inventors: Masafumi Sakamoto, Gumma (JP); Yoji Unoki, Gumma (JP)

(73) Assignee: Nidec Servo Corporation, Gumma (JP)

( * ) Notice: Subject to any disclaimer, the term of this patent is extended or adjusted under 35 U.S.C. 154(b) by 0 days.

(21) Appl. No.: 12/624,500

(22) Filed: Nov. 24, 2009

(65) Prior Publication Data

US 2010/0066184 A1    Mar. 18, 2010

Related U.S. Application Data

(63) Continuation of application No. PCT/JP2008/060148, filed on Jun. 2, 2008.

(30) Foreign Application Priority Data

May 31, 2007    (JP) .................................. 2007-145541

(51) Int. Cl.
*H02K 37/00*    (2006.01)
(52) U.S. Cl. .................................................... 310/49.44
(58) Field of Classification Search .... 310/49.01–49.55, 310/254.1
See application file for complete search history.

(56) References Cited

U.S. PATENT DOCUMENTS

| | | | | |
|---|---|---|---|---|
| 4,255,696 | A * | 3/1981 | Field, II | .................. 318/696 |
| 6,545,376 | B2 * | 4/2003 | Ohnishi et al. | .......... 310/49.34 |
| 6,674,187 | B2 | 1/2004 | Isozaki et al. | |
| 6,707,178 | B2 * | 3/2004 | Sakamoto et al. | ...... 310/49.37 |
| 2001/0038249 | A1 | 11/2001 | Ohnishi et al. | |
| 2002/0079749 | A1 * | 6/2002 | Ohnishi et al. | ........... 310/49 R |
| 2002/0089243 | A1 | 7/2002 | Isozaki et al. | |
| 2007/0120426 | A1 * | 5/2007 | Oiwa et al. | ................ 310/49 R |
| 2010/0133929 | A1 * | 6/2010 | Sakamoto et al. | ........ 310/49.44 |

FOREIGN PATENT DOCUMENTS

| | | |
|---|---|---|
| JP | 3-212149 A | 9/1991 |
| JP | 2002-272081 A | 9/2002 |
| JP | 2007-89304 A | 4/2007 |
| WO | 2007/034868 A1 | 3/2007 |

OTHER PUBLICATIONS

English translation of Official Communication issued in corresponding International Application PCT/JP2008/060148, mailed on Jan. 21, 2010.
Official Communication issued in corresponding International Application PCT/JP2008/060148, mailed on Dec. 1, 2009.
Official Communication issued in International Patent Application No. PCT/JP2008/60148, mailed on Aug. 12, 2008.

* cited by examiner

*Primary Examiner* — Nguyen N Hanh
(74) *Attorney, Agent, or Firm* — Keating & Bennett, LLP

(57) ABSTRACT

A hybrid type stepper motor preferably includes a two-phase eight-main-pole stator and a rotor defined by two rotor units each having a pair of rotor magnetic poles with a permanent magnet interposed therebetween. Each rotor magnetic pole has fine teeth at a regular pitch. The permanent magnets are magnetized in opposite directions to each other. The adjacent rotor magnetic poles of the rotor units are arranged with their fine teeth aligned with each other in the axial direction. Each main pole has six inductor teeth including: a pair of innermost inductor teeth arranged at the first pitch in the central portion of the main pole; a pair of intermediate teeth on the outside of the innermost inductor teeth at the second pitch therefrom; and a pair of outermost inductor teeth on the outside of the intermediate inductor teeth at the third pitch therefrom. The first, second, and third pitches are all different from the pitch of the fine teeth of the rotor magnetic pole. At least one of the first, second, and third pitches is different from the others.

9 Claims, 6 Drawing Sheets

HYBRID TYPE ROTARY ELECTRIC MACHINE

BACKGROUND OF THE INVENTION

1. Field of the Invention

The present invention relates to a hybrid type rotary electric machine such as a stepper motor, which achieves a high torque within a compact size, offers low vibration, and is suitable for office machines.

2. Description of the Related Art

JP-A-3-212149 (hereinafter, referred to as JP '149) discloses an exemplary hybrid type stepper motor in accordance with the prior art. This stepper motor includes a two-phase stator having eight main poles and a hybrid type rotor. Each main pole of the stator has inductor teeth at the tip thereof. The hybrid type rotor includes a pair of rotor magnetic poles each having fine teeth on its outer peripheral surface, and a permanent magnet arranged between the rotor magnetic poles. The permanent magnet is magnetized in the axial direction.

FIG. 8 shows one stator main pole 1 and a portion of the rotor magnetic pole 2 of the stepper motor disclosed in JP '149. Six inductor teeth are arranged at a regular pitch at the tip of the stator main pole, and includes a pair of innermost inductor teeth 1c and 1d in the central portion of the main pole, a pair of intermediate inductor teeth 1b and 1e on the outside of the innermost inductor teeth 1c and 1d, and a pair of outermost inductor teeth 1a and 1f on the outside of the intermediate inductor teeth 1b and 1e. The fine teeth 2a of the rotor magnetic pole 2 are arranged at a regular pitch on the outer peripheral of the rotor magnetic pole 2.

In the stepper motor of JP '149, the tooth pitch of the fine teeth 2a of the rotor magnetic pole 2 and the tooth pitch of the inductor teeth 1a to 1f of the stator main pole 1 are set to 7.2 degrees and 6.9 degrees in mechanical angle, respectively, in order to reduce distortion of the stiffness characteristics.

When the center line C of the stator main pole 1 is aligned with the center line of the space between two fine teeth 2a of the rotor magnetic pole 2, as shown in FIG. 8, the center lines of the six inductor teeth 1a to 1f of the stator main pole 1 are displaced from the center lines of the opposed fine teeth 2a by displacement angles $\theta 1$ to $\theta 6$, respectively. Assuming that the tooth pitch of the fine teeth 2a of the rotor magnetic pole 2, i.e., 7.2 degrees in mechanical angle corresponds to 360 degrees in electrical angle, $\theta 1$ to $\theta 6$ are calculated as follows.

$$\theta 3 = \theta 4 = (0.3°/2)(360°/7.2°) = 7.5°$$

$$\theta 2 = \theta 5 = (0.3° + 0.3°/2)(360°/7.2°) = 22.5°$$

$$\theta 1 = \theta 6 = (0.3° + 0.3° + 0.3°/2)(360°/7.2°) = 37.5°$$

In this case, the fundamental component P1 of permeances of the six inductor teeth, which generates magnetic flux linkage and a motor torque, is calculated by Expression 1.

$$P1 = \cos\theta 3 + \cos\theta 2 + \cos\theta 1 + \cos\theta 4 + \cos\theta 5 + \cos\theta 6 \quad \text{(Expression 1)}$$
$$= 2(\cos 7.5° + \cos 22.5° + \cos 37.5°)/6$$
$$= 0.902$$

Thus, 90.2% of the permeances of the six inductor teeth forms a torque component.

The fourth harmonic component P4 of the permeance of the six inductor teeth which generates a cogging torque is calculated by Expression 2.

$$P4 = \cos 4\theta 3 + \cos 4\theta 2 + \cos 4\theta 1 + \cos 4\theta 4 + \cos 4\theta 5 + \cos 4\theta 6 \quad \text{(Expression 2)}$$
$$= 2(\cos 30° + \cos 90° + \cos 150°)°$$
$$= 0$$

FIG. 9 shows distribution of vectors V1 to V6 of the permeances of the inductance teeth 1a to 1f in the fourth harmonic plane where a mechanical angle of 7.2 degrees corresponds to an electrical angle of 360 degrees. As shown in FIG. 9, the sum of the vectors is zero. This means that the cogging torque is cancelled out, in theory.

U.S. Pat. No. 6,674,187 (hereinafter, referred to as U.S. Pat. No. '187) discloses another exemplary hybrid type stepper motor in accordance with the prior art in which two rotor units with a non-magnetic plate interposed therebetween are fixed to a shaft. Each rotor unit has a pair of rotor magnetic poles and a permanent magnet arranged therebetween. The two permanent magnets of the rotor units are magnetized in the same direction as each other.

In the stepper motor of JP '149, the cogging torque is canceled only when the permeances of the six inductance teeth of the stator main pole are substantially equal to one another. Actually, the cogging torque of the stepper motor of JP '149 cannot be zero because of a difference between the permeances. More specifically, a distance of each inductor tooth from the center of the main pole is different among the innermost inductor teeth, the intermediate inductor teeth, and the outermost inductor teeth. In addition, the condition of leakage of magnetic fluxes generated by each outermost inductor tooth 1a or 1f is different from those of other inductor teeth 1b to 1e because of air existing on one side of the outermost inductor tooth. For those reasons, all the permeances of the inductor teeth 1a to 1f are not the same.

Moreover, the torque of the stepper motor of JP '149 cannot be increased without increasing the size of the stepper motor of JP '149 in the radial direction, because the stepper motor only includes a single rotor unit. One approach to increase the torque is to provide two rotor units along the rotation shaft, as disclosed in US '187.

However, even in the stepper motor of US '187, it is difficult to achieve a sufficiently high torque with a low vibration for the following reasons. First, the rotor portion of the stepper motor of US '187 includes a non-magnetic plate for magnetically insulating two rotor units from each other. No torque is generated at the non-magnetic plate, and the magnetic fluxes of the magnetic circuit which pass through those two rotor units are weakened by each other around the non-magnetic-plate. Therefore, a sufficiently high torque cannot be obtained. Second, the non-magnetic plate has to be thick enough to prevent the magnetic flux leakage. This may increase the cost of the rotary electric machine.

Furthermore, in a case where a plurality of rotor units are provided as in the stepper motor of US '187, the stator must be thick in the axial direction and the cogging torque caused by the magnetic fluxes of the permanent magnets also increases. This cogging torque may cause vibration during the motor rotation or degrade the positioning accuracy.

SUMMARY OF THE INVENTION

Preferred embodiments of the present invention provide a hybrid type rotary electric machine which can provide a high torque with a low vibration.

According to a preferred embodiment of the present invention, a hybrid type rotary electric machine preferably includes: a shaft; a two-phase stator arranged around the shaft, and a rotor portion. The two-phase stator preferably includes an approximately ring-shaped magnetic body and preferably eight, for example, main poles projecting radially from the magnetic body. Each main pole preferably has six, for example, inductor teeth at the tip thereof. The rotor portion includes first and second rotor units having substantially the same structure and being fixed to the shaft. Each of the first and second rotor units preferably includes a pair of rotor magnetic poles and a permanent magnet arranged therebetween. Each rotor magnetic pole has a plurality of fine teeth which are arranged at a substantially regular pitch and opposed to the stator via air. In each rotor magnetic pole, the fine teeth of one rotor magnetic pole are preferably offset by half a pitch from those of the other rotor magnetic pole. The adjacent rotor magnetic poles of the first and second rotor magnetic poles are arranged in such a manner that the fine teeth thereof are aligned with each other in an axial direction, and have the same magnetic polarity.

The six inductor teeth of each main pole of the stator preferably includes a pair of innermost inductor teeth arranged at the first pitch in a central portion of the main pole; a pair of intermediate inductor teeth arranged on the outside of the innermost inductor teeth at the second pitch from the innermost inductor teeth; and a pair of outermost inductor teeth arranged on the outside of the intermediate inductor teeth at the third pitch from the intermediate inductor teeth. All the first, second, and third pitches are different from the tooth pitch of the fine teeth of the rotor magnetic poles. At least one of the first, second, and third pitches is different from the others.

The sum of a vector of a permeance of one of the innermost inductor teeth, a vector of a permeance of an adjacent one of the intermediate inductor teeth, and a vector of permeance of an adjacent one of the outermost inductor teeth in the fourth harmonic plane is substantially zero. In addition, the sum of the vectors of the permeances of the inductor teeth at symmetrical positions with respect to the center line of the main pole in the fourth harmonic plane is substantially zero. That is, the sum of the permeance vectors of the innermost inductor teeth, the sum of the permeance vectors of the intermediate inductor teeth, and the sum of the permeance vectors of the outermost inductor teeth in the fourth harmonic plane are substantially zero. Moreover, the vectors of the permeances the innermost, intermediate, and outermost inductor teeth of the first rotor unit in the fourth harmonic plane and the vectors of the permeances of the innermost, intermediate, and outermost inductor teeth of the second rotor unit in the fourth harmonic plane are canceled out by each other.

It is preferable that the innermost inductor teeth have the same tooth width as each other, the intermediate inductor teeth have the same tooth width as each other, and the outermost inductor teeth have the same width of each other. It is further preferable that the width of any of the innermost inductor teeth, the intermediate inductor teeth, and the outermost inductor teeth be different from the widths of the other inductor teeth.

It is also preferable that the inductor teeth in the same pair are arranged symmetrically with respect to the center line of the main pole.

Moreover, it is desirable that a value obtained by dividing the tooth width of the innermost inductor tooth of the main pole of the stator by the first pitch, a value obtained by dividing the tooth width of the intermediate inductor tooth by the second pitch, and a value of the outermost inductor tooth by the third pitch be in the range from about 0.37 to about 0.39, for example.

Furthermore, a distance between the rotor portion and any of the innermost inductor tooth, the intermediate inductor tooth, and the outermost inductor tooth may be different from those of the rotor portion and other inductor teeth.

According to the preferred embodiments of the present invention, the permanent magnets of the two rotor units are axially magnetized in the opposite directions to each other, and are concentrically arranged to be adjacent to each other. Therefore, reduction of the magnetic fluxes caused by interference between the magnetic fluxes running in different directions does not occur. Moreover, it is not necessary to use a non-magnetic plate. Thus, there is little leakage of the magnetic fluxes and a high torque can be obtained within a reduced size.

In the preferred embodiments of the present invention, the six inductor teeth of the stator main pole are preferably arranged at irregular pitches. Thus, the design freedom for canceling the fourth harmonics can be increased.

In a case where the inner inductor teeth have the same tooth width as each other, the intermediate inductor teeth have the same tooth width as each other, the outermost inductor teeth have the same tooth width as each other, and at least one of the inner, intermediate, and outermost inductor teeth have a different tooth width from those of the other inductor teeth, the harmonics reduction effect can be further increased because the effect of imbalance of the magnetic circuit and the effect of the permeance difference caused by the position of the inductor teeth are canceled. In other words, the harmonics reduction effect provided by the irregular-tooth-width arrangement of the inductor teeth is added to the harmonics reduction effect provided by the irregular-pitch arrangement of the inductor teeth. As a result, the harmonics can be canceled by two ways at the same time. Also, vibration generation caused by the magnetic resistance difference between two magnetic circuits in the two rotor units can preferably be minimized and prevented.

The ratio of the tooth width to pitch of each inductor tooth is preferably set to be in the range from about 0.37 to about 0.39, for example, in the hybrid type rotary electric machine of a preferred embodiment of the present invention. This setting allows the magnetic fluxes from the rotor to interlink with the coil windings of the stator with a minimum flux leakage, thus providing a high torque.

When an air gap, i.e., a distance between an inductor tooth and the rotor is changed depending on the position of the inductor tooth, the design freedom for the harmonics-reduction effects can be further increased.

According to the preferred embodiments of the present invention, it is possible to provide a high torque without increasing the size of the hybrid type rotary electric machine. However, in applications which do not require a high torque, a weak and inexpensive magnet, such as, for example, a ferrite magnet, may be used. Since the slope of B-H curve of the ferrite magnet is nearly flat, the resultant magnetic fluxes do not vary largely even if an operating point is moved by air gap variations or the like, and a low-vibration rotary electric machine can be obtained due to the uniform magnetic flux density.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figure 1:
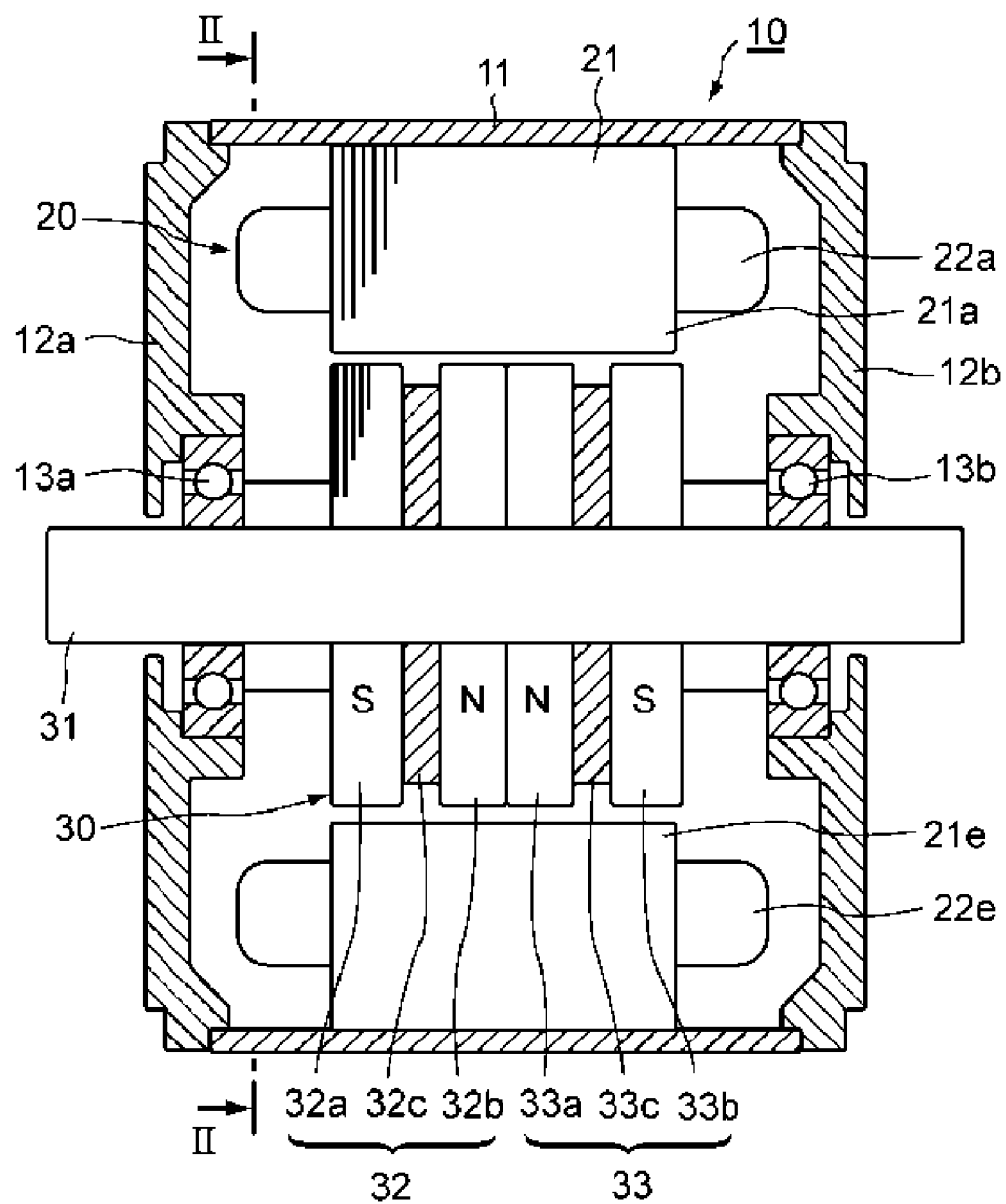
FIG. 1 is a cross-sectional view of a hybrid type stepper motor according to a preferred embodiment of the present invention, taken along a plane parallel to a rotation axis of the motor.

Referring to FIGS. 1 through 7, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel or substantially parallel to a rotation axis, and a radial direction indicates a direction perpendicular or substantially perpendicular to the rotation axis.

A hybrid type rotary electric machine according to preferred embodiments of the present invention is described referring to the drawings. In the present preferred embodiment, the hybrid type rotary electric machine is preferably a hybrid type stepper motor.

Figure 2:
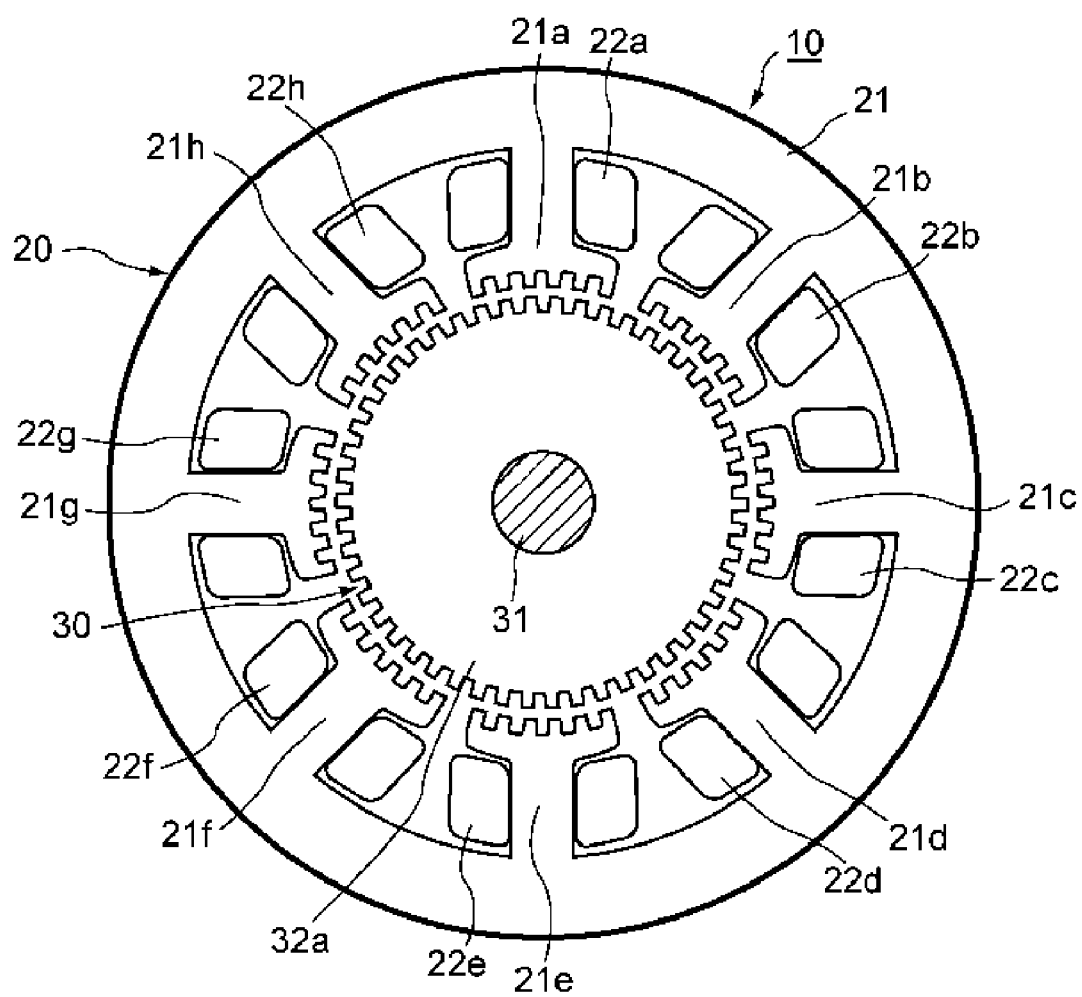
FIG. 2 is a cross-sectional view of the hybrid type stepper motor of FIG. 1, taken along line II-II in FIG. 1.
Figure 3:
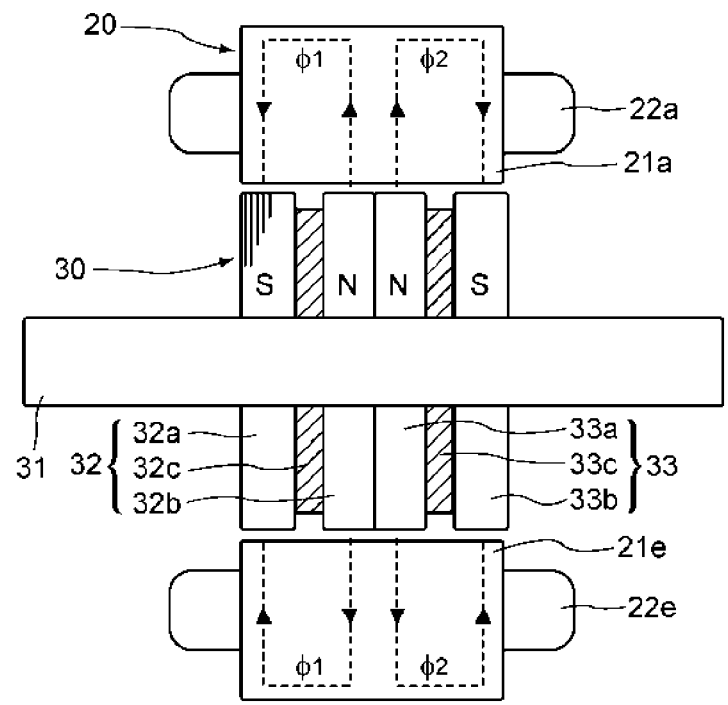
FIG. 3 is a cross-sectional view of a stator and a rotor of the hybrid type stepper motor of FIG. 1.

FIG. 1 is a cross-sectional view of the hybrid type stepper motor 10 of this preferred embodiment, taken along a plane substantially parallel to the rotation axis thereof. FIG. 2 is a cross-sectional view of the hybrid type stepper motor 10, taken along line II-II in FIG. 1. FIG. 3 is a cross-sectional view of a portion of the hybrid type stepper motor 10, including a stator and a rotor. The hybrid type stepper motor 10 preferably includes a substantially cylindrical casing 11 with a pair of disk-shaped end plates 12a and 12b which close both ends of the casing 11, a two-phase, eight-pole stator 20 fixed into the casing 11, and a rotor 30 mounted onto the end plates 12a and 12b via bearings 13a and 13b.

The stator 20 preferably includes a stator core 21 and coil windings 22a to 22h. The stator core 21 preferably includes a plurality of stacked silicon steel plates defining an approximately ring-shaped magnetic body and preferably eight, for example, main poles 21a to 21h projecting radially from the magnetic body. Each main pole preferably has six, for example, inductor teeth at its tip. The coil windings 22a to 22h are arranged around the base ends of the main poles 21a to 21h, respectively. The coil windings 22a, 22c, 22e, and 22g around the main poles 21a, 21c, 21e, and 21g are connected to each other in this order to define the first phase, and the windings 22b, 22d, 22f, and 22h around the main poles 21b, 21d, 21f, and 21h are connected to each other in this order to define the second phase.

The rotor 30 preferably includes a first rotor unit 32 and a second rotor unit 33 both fixed to a shaft 31 arranged along an axial direction. The first and second rotor units 32 and 33 are disposed adjacent to each other. The first rotor unit 32 preferably includes a pair of rotor magnetic poles 32a and 32b and an axially magnetized permanent magnet 32c arranged between the pair of rotor magnetic poles 32a and 32b. Each rotor magnetic pole 32a, 32b has a plurality of fine teeth arranged at a regular pitch on its outer periphery. That is, the fine teeth are to be opposed to the stator 20 via the air gap between the rotor 30 and the stator 20. The rotor magnetic poles 32a and 32b are preferably disposed with their fine teeth offset from each other by half a tooth pitch. The second rotor unit 33 has substantially the same structure as the first rotor unit 32. That is, the second rotor unit 33 includes a pair of rotor poles 33a and 33b and a permanent magnet 33c arranged therebetween.

Each of the rotor poles 32a, 32b, 33a, and 33b is preferably defined by a plurality of stacked silicon steel plates in this preferred embodiment. The permanent magnets 32c and 33c are magnetized in opposite directions to each other. The inner rotor magnetic poles of the first and second rotor units 32 and 33, i.e., the rotor magnetic pole 32b and the rotor magnetic pole 33a which are axially adjacent to each other are magnetized with the same polarity, e.g., north polarity in this preferred embodiment. Moreover, the inner rotor magnetic poles 32b and 33a are arranged with their fine teeth aligned with each other in the axial direction.

FIG. 3 shows a magnetic path of the magnetic flux $\Phi 1$ generated by the first rotor unit 32 and a magnetic path of the magnetic flux $\Phi 2$ generated by the second rotor unit 33. As is apparent from FIG. 3, the magnetic fluxes $\Phi 1$ and $\Phi 2$ flow in the same direction in the axially central portion of the stator 20 and therefore those magnetic fluxes $\Phi 1$ and $\Phi 2$ are not weakened by each other. In addition, the magnetic fluxes $\Phi 1$ and 2 do not leak between the adjacent rotor magnetic poles 32b and 33a but rather, almost all magnetic fluxes flow toward the stator 20, although the magnetic fluxes may leak between the rotor magnetic poles 32a and 32b and between the rotor poles 33a and 33b around the outer periphery of the permanent magnets 32c and 33c. Therefore, loss of the magnetic flux is extremely small and a high torque can be produced.

Figure 4:
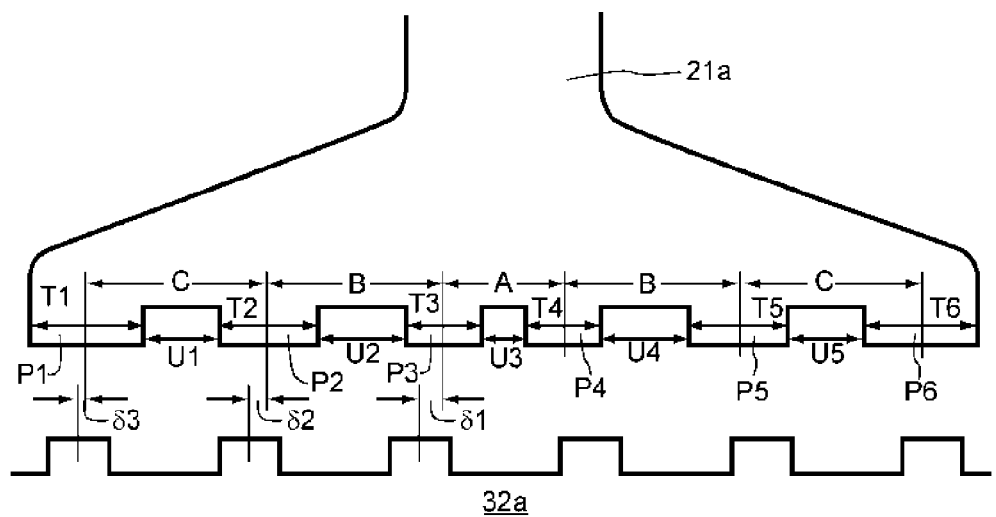
FIG. 4 shows one main pole of the stator and an opposed portion of a rotor magnetic pole in the stepper motor of FIG. 1.

Next, the arrangement of the inductor teeth of each main pole of the stator 20 in this preferred embodiment is described referring to FIG. 4. FIG. 4 is an exploded view of the main pole 21a and a portion of the stator pole 32a opposed thereto. Please note that the inductor teeth of other main poles 21b to 21h are arranged in the same manner as the ones of the main pole 21a. The inductor teeth P1 to P6 of the main pole 21a are arranged as follows. A pair of innermost inductor teeth P3 and P4 are disposed in the central portion of the tip of the main pole 21a to be spaced apart from each other by the first pitch A. A pair of intermediate inductor teeth P2 and P5 are spaced apart from the innermost inductor teeth P3 and P4 by the second pitch B on the outside thereof. A pair of outermost inductor teeth P1 and P6 are spaced apart from the intermediate inductor teeth P2 and P5 on the outside thereof by the third pitch C. In this preferred embodiment, all the first, second, and third pitches A, B, and C are different from the tooth pitch of the fine teeth of the rotor magnetic pole, and at least one of the first, second, and third pitches A, B, and C is different from the other pitches.

Figure 6:
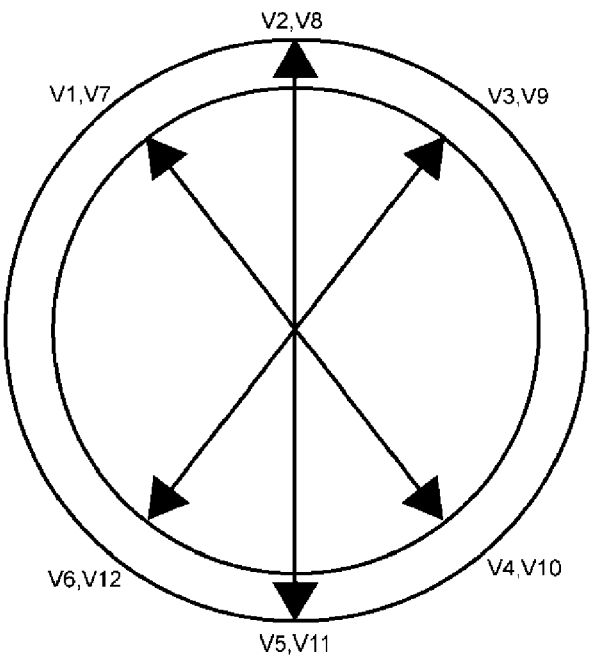
FIG. 6 shows distribution of vectors of permeances of inductor teeth for the first and second rotor units in the stepper motor of FIG. 1 in the fourth harmonic plane.

The inductor teeth in each pair are arranged symmetrically with respect to the center line of the main pole 21a. When the main pole 21a of the stator 20 and the rotor magnetic pole 32a are opposed to each other with the tip center of the main pole 21a aligned with the groove center between given fine teeth of the rotor pole 32a, the tip centers of the inductor teeth P1 to P6 are displaced from the tip centers of the opposed fine teeth by displacement angle δ1 to δ6, respectively, as shown in FIGS. 4 and 6. In this preferred embodiment, the displacement angles δ1 and δ6 are equal to each other; the displacement angles δ2 and δ5 are equal to each other; and the displacement angles δ3 and δ4 are equal to each other. With this inductor teeth arrangement, the displacement angles δ1 to δ6 can be set to any desired angle, thus greatly increasing design freedom as compared with the case where the inductor teeth are disposed at a regular pitch. Therefore, the irregular-pitch arrangement of the inductor teeth is resistant to variations in six permeances of inductor teeth and can cancel the fourth harmonic components of the permeances.

In this preferred embodiment, the first, second, and third pitches A, B, and C are preferably set to satisfy the following conditions.

Assuming that, in one main pole of the stator 20 which is opposed to the first and second rotor units 32 and 33, one innermost inductor tooth, the adjacent intermediate inductor tooth on the outside of that innermost inductor tooth, and the adjacent outermost inductor tooth on the outside of that intermediate inductor tooth define one group, the vector sum of the permeances of the inductor teeth in the same group in the fourth harmonic plane is substantially zero. In other words, the vector sum of the permeances of the inductor teeth P1, P2, and P3 in the fourth harmonic plane is substantially zero, and the vector sum of the permeances of the inductor teeth P4, P5, and P6 in the forth harmonic plane is substantially zero.

In addition, the vector sum of the permeances of two inductor teeth at the symmetrical positions with respect to the center line of the main pole in the fourth harmonic plane is substantially zero. That is, the vector sum of the permeances of the inductor teeth P3 and P4, the vector sum of the permeances of the inductor teeth P2 and P5, and the vector sum of the permeances of the inductor teeth P1 and P6 are substantially zero in the fourth harmonic plane.

The vectors of the permeances of six inductor teeth of the main pole of the stator 20 which are opposed to the first rotor unit 32 in the fourth harmonic plane cancel out those of the inductor teeth which are opposed to the second rotor unit 33.

In this preferred embodiment, the tooth widths of the inductor teeth are set in the following manner. Assuming that the tooth widths of the inductor teeth P1 to P6 are T1 to T6 and the widths of the spaces between the inductor teeth P1 to P6 are U1 to U5, respectively, they are symmetrical with respect to the center line of the main pole. That is, T1=T6, T2=T5, T3=T4, U1=U5, and U2=U4.

If the tooth widths T1 and T6 of the outermost inductor teeth P1 and P6 are the same as the tooth widths T2 to T5 of the other inductor teeth P2 to P5, the permeances of the outermost inductor teeth P1 and P6 are different from those of the other inductor teeth P2 to P5 because of the difference in magnetic resistance which varies depending on the tooth position or the difference in the magnetic path of the leaking magnetic flux, for example. To compensate for this permeance difference, the tooth widths are set to make the permeances of the six inductor teeth substantially equal to one another in this preferred embodiment. For example, in a case where the outermost inductor teeth P1 and P6 have smaller permeances than the other inductor teeth P2 to P5 if all the six inductor teeth P1 to P6 have the same tooth width, the tooth widths T1 and T6 of the inductor teeth P1 and P6 are set to be larger than the tooth widths T2 to T5 in order to compensate for the permeance difference.

For each inductor tooth, a value obtained by dividing the tooth width by the pitch from the inner adjacent inductor tooth is preferably set in a range from about 0.37 to about 0.39, for example, in this preferred embodiment. Please note that for the innermost inductor tooth, the pitch from the inner adjacent inductor tooth is the pitch between the innermost inductor teeth, i.e., the first pitch A. More specifically, a value T3/A obtained by dividing the tooth pitch T3 of the innermost inductor tooth P3 by the first pitch A, a value T2/B obtained by dividing the tooth pitch T2 of the intermediate inductor tooth P2 by the second pitch B, and a value T1/C obtained by dividing the toot pitch T1 of the outermost inductor tooth P1 by the third pitch C are preferably in the range from about 0.37 to about 0.39, for example. The above range is obtained by magnetic field analysis performed by the inventors of the present invention using computers. With this setting of the tooth widths and the pitches A, B, and C, it is possible to obtain a high torque. Moreover, when the tooth width of the inductor tooth is changed, the ratio of the tooth width to the tooth pitch is also changed. Thus, it is preferable that the aforementioned values T3/A, T2/B, and T1/C be chosen to be optimum independently of one another to further reduce higher order harmonic components.

Alternatively, the permeances of the respective inductor teeth can be balanced by making at least one of the distances between the respective inductor teeth and the rotor magnetic pole different from the others, instead of making the tooth widths unequal.

Figure 5:
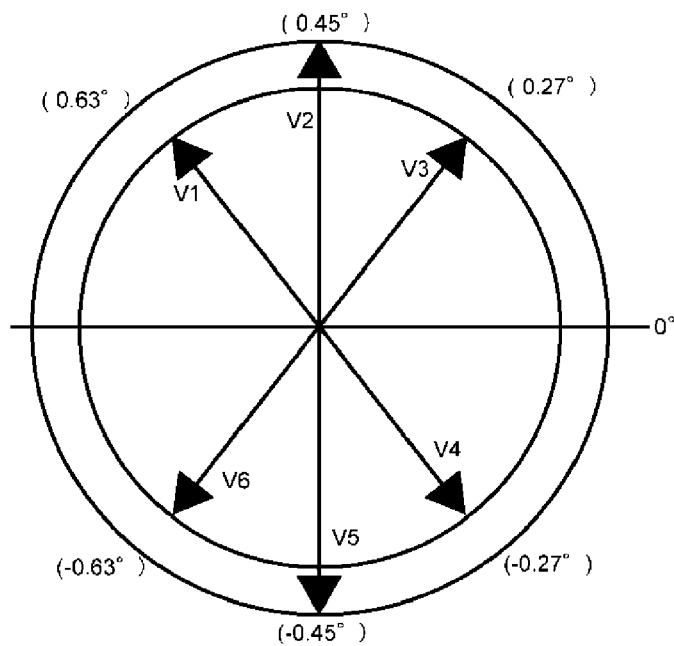
FIG. 5 shows distribution of vectors of permeances of inductor teeth for the first rotor unit in the stepper motor of FIG. 1 in the fourth harmonic plane.

A specific example of the irregular-pitch arrangement of the inductor teeth is described below. In this example, each rotor magnetic pole has 50 fine teeth and the tooth pitch of the fine teeth is 7.2 degrees in mechanical angle. FIG. 5 shows the permeances of the inductor teeth P1 to P6 for the first rotor unit 32 in the form of vectors V1 to V6 in the fourth harmonic plane in a case where the first pitch A is 6.66 degrees and the second and third pitches B and C are 7.02 degrees in mechanical angle. The displacement angles δ1 to δ6 of the respective inductor teeth P1 to P6 from the corresponding opposed fine teeth of the rotor magnetic pole are set as follows in mechanical angle: δ1=δ6=−0.63 degrees; δ2=δ5=−0.45 degrees; and δ3=δ4=−0.27 degrees. Thus, the vectors are symmetrical with respect to the 0-degree axis and the projected components on the 0-degree axis are canceled out. Even if the vectors V2 and V5 have larger magnitudes than other vectors V1, V3, V4, and V6, the vectors V2 and V5 are canceled out by each other and other vectors are also canceled out. Moreover, the projected components of the vectors V1, V2, and V3 on the 0-degree axis are canceled by one another, while those of the vectors V4, V5, and V6 are canceled by one another.

FIG. 6 shows the permeances of the inductor teeth P1 to P6 for the first rotor unit 32 and those for the second rotor unit 33 in vectors in the fourth harmonic plane. Vectors V1 to V6 are for the first rotor unit 32, and vectors V7 to V12 are for the second rotor unit 33. As is shown in FIG. 6, the twelve permeance vectors of the six inductor teeth in a given main pole of the stator can be balanced in this preferred embodiment. The permeance vectors may be distributed on the basis of the displacement angles of the respective inductor teeth from the corresponding opposed fine teeth of the rotor magnetic pole in a similar manner to FIG. 5. In this case, the projected components on the 0-degree axis which runs through the center line of the main pole are canceled out by one another.

In a case where the inductor teeth arrangement is designed to balance the twelve permeance vectors, the design freedom is increased as compared with the case of balancing the six permeance vectors, and therefore the design is less likely to be affected by the assembly precision, component accuracy, and the like. More specifically, in the case of balancing six permeance vectors, among the permeance vectors of the inductor teeth on the same side of the center line of the main pole, e.g., the vectors V1 to V3, the vectors which are symmetrical with respect to a line in the fourth harmonic plane are canceled out by one another. Moreover, the permeance vectors which are not symmetrical with respect to a line but symmetrical with respect to a point in the fourth harmonic plane, for example, the vectors V1 and V4 are also canceled out by each another. In the case of balancing twelve vectors, in addition to the above-described two way of cancellation in the case of balancing six vectors, the permeance vectors for the first rotor unit 32 can be canceled by the permeance vectors for the second rotor unit 33. For example, the permeance vector V1 is canceled by the permeance vector V10. This is especially advantageous to increase the torque by increasing the motor length in the axial direction, because, as the motor length in the axial direction increases, it is more difficult to keep the air gaps uniform and higher order harmonics can be easily generated. In other words, the arrangement including two rotor units is advantageous not only to increase the torque but also to reduce the vibration.

Figure 7:
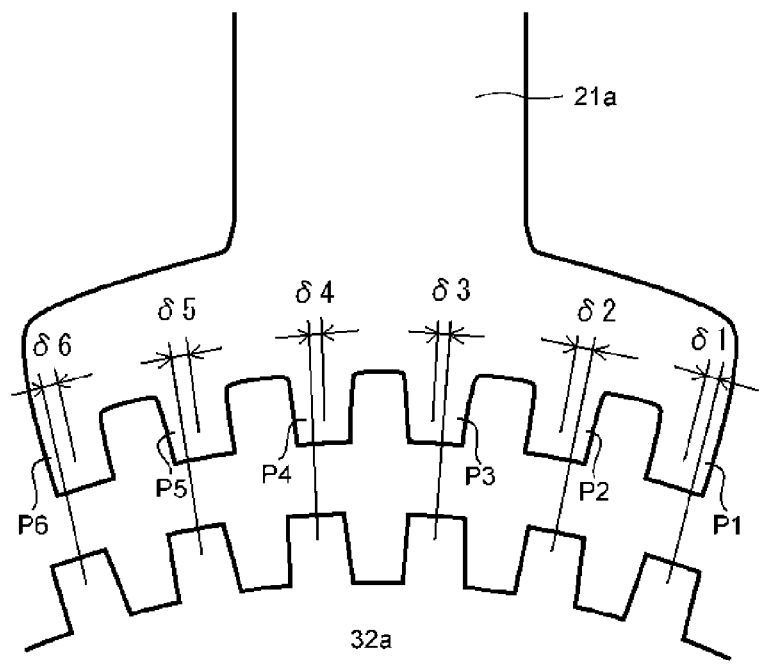
FIG. 7 is a developed view of the stator main pole and an opposed portion of the rotor magnetic pole to the stator main pole in the stepper motor of FIG. 1, in a case where a different tooth pitch design from that in the example of FIG. 4 is applied.
Figure 8:
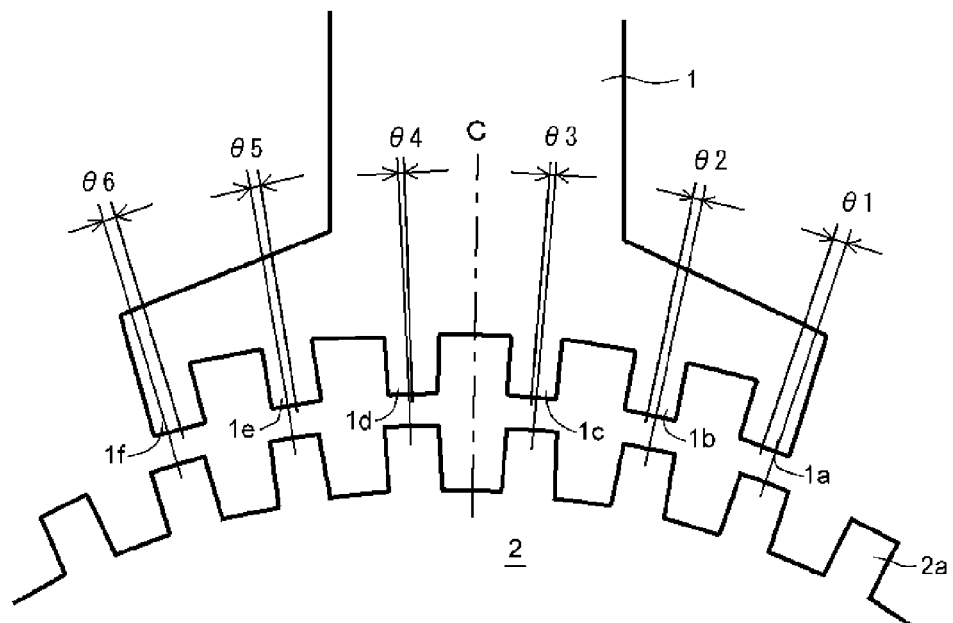
FIG. 8 shows one stator main pole and an opposed portion of the rotor magnet pole in an exemplary conventional stepper motor.
Figure 9:
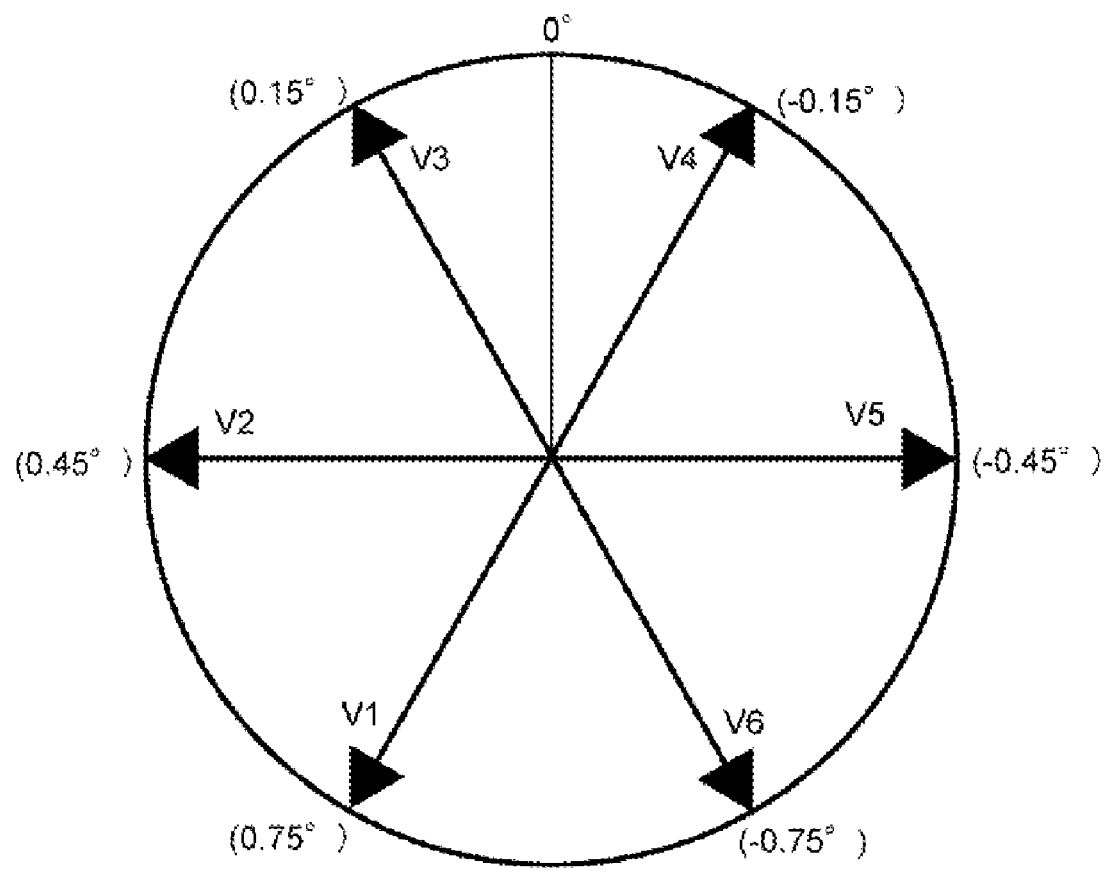
FIG. 9 shows distribution of vectors of permeances of inductor teeth of one stator main pole in the stepper motor of FIG. 8 in the fourth harmonic plane.

FIG. 7 shows the main pole 21a and a portion of the rotor magnetic pole 32a opposed to the main pole 21a in a case where the first, second, and third pitches A, B, and C are 6.66 degrees, 6.84 degrees, and 7.38 degrees in mechanical angle, respectively. In this case, the displacement angles δ1 to δ6 of the inductor teeth P1 to P6 from the corresponding opposed fine teeth of the rotor magnetic pole are as follows in mechanical angle: δ1=δ6=0.45 degrees; δ2=δ5=0.63 degrees; and δ3=δ4=0.27 degrees. The distribution of the permeance vectors of the respective inductor teeth are the same as that in the example of FIG. 5. The projected components of the permeance vectors on the 0-degree axis are symmetrical with respect to the 0-degree axis and therefore they are canceled. In the example of FIG. 7, the fourth harmonic component Λ4 of the permeance of the inductor teeth is calculated by Expression 3.

$$\Lambda 4 = \cos 4\delta 3 + \cos 4\delta 2 + \cos 4\delta 1 + \cos 4\delta 4 + \cos 4\delta 5 + \cos 4\delta 6 \quad \text{(Expression 3)}$$

$$= 2 \left\{ \begin{array}{l} \cos 4 \times 0.27 \times 360/7.2 + \cos 4 \times 0.63 \times \\ 360/7.2 + \cos 4 \times 0.45 \times 360/7.2 \end{array} \right\}$$

$$= \cos 54° + \cos 126° + \cos 90°$$

$$= 0.5877 - 0.5877$$

$$= 0$$

Thus, the fourth harmonic component θ4 is zero in the example of FIG. 7.

Moreover, the fundamental component Λ1 of the permeance of the inductor teeth, which generates the flux linkage functioning as the motor torque, is calculated by Expression 4.

$$\Lambda 1 = \cos \delta 3 + \cos \delta 2 + \cos \delta 1 + \cos \delta 4 + \cos \delta 5 + \cos \delta 6 \quad \text{(Expression 4)}$$

$$= 2\{\cos 13.5° + \cos 31.5° + \cos 22.5°\}/6$$

$$= 0.9163$$

From Expression 4, approximately 91.6% of the permeance of the inductor teeth forms the torque component in the example of FIG. 7. This value is larger than the torque obtained in the regular-pitch arrangement described in Related Art which is calculated by Expression 2.

As described above, the hybrid type rotary electric machine of preferred embodiments of the present invention can provide a high torque with low vibration without using a non-magnetic plate. Because the non-magnetic plate is not necessary, this hybrid type rotary electric machine can be manufactured with high productivity at a low cost. Thus, the hybrid type rotary electric machine according to preferred embodiments of the present invention can be applied to office machines such as a copier and a printer, as a two-phase stepper motor, a two-phase AC synchronous electric motor, or a two-phase brushless DC motor which can provide a high torque with low vibration at a low cost. Moreover, the hybrid type rotary electric machine according to preferred embodiments of the present invention can be also applied to medical devices, robots, factory automation equipment, game machines, amusement machines, housing equipment, for example.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A rotary electric machine comprising:
a shaft;
a two-phase stator, arranged around the shaft and including an approximately ring-shaped magnetic body, and a plurality of main poles projecting radially from the magnetic body, each main pole including a plurality of inductor teeth arranged at a tip thereof; and
a rotor portion including first and second rotor units which have substantially the same structure and are fixed to the shaft, each of the first and second rotor units including a pair of rotor magnetic poles and a permanent magnet arranged therebetween, each rotor magnetic pole including a plurality of fine teeth which are arranged at a substantially regular pitch and opposed to the stator via an air gap, the fine teeth of one of the pair of rotor magnetic poles being offset by half a pitch from the fine teeth of the other rotor magnetic pole, the adjacent rotor magnetic poles of the first and second rotor magnetic poles being arranged with their fine teeth aligned with each other in an axial direction and having the same magnetic polarity; wherein
the plurality of inductor teeth of each main pole of the stator include a pair of innermost inductor teeth arranged at a first pitch in a central portion of the main pole, a pair of intermediate inductor teeth arranged on the outside of the innermost inductor teeth and at a second pitch from the innermost inductor teeth, and a pair of outermost inductor teeth arranged on the outside of the intermediate inductor teeth and at a third pitch from the intermediate inductor teeth, each of the first pitch, the second pitch, and the third pitch being different from a tooth pitch of the fine teeth of the rotor magnetic poles, and at least one of the first pitch, the second pitch, and the third pitch being different from the other ones of the first pitch, the second pitch, and the third pitch;

a sum of a vector of a permeance of one of the innermost inductor teeth, a vector of a permeance of an adjacent one of the intermediate inductor teeth, and a vector of permeance of an adjacent one of the outermost inductor teeth in the fourth harmonic plane is substantially zero;

a sum of vectors of permeances of inductor teeth at symmetrical positions with respect to a center line of the main pole in the fourth harmonic plane is substantially zero; and vectors of permeances of the innermost, intermediate, and outermost inductor teeth for the first rotor unit in the fourth harmonic plane and vectors of permeances the innermost, intermediate, and outermost inductor teeth for the second rotor unit in the fourth harmonic plane are canceled out by each other.

2. A rotary electric machine according to claim 1, wherein the innermost inductor teeth have the same tooth width as each other, the intermediate inductor teeth have the same tooth width as each other, and the outermost inductor teeth have the same width of each other.

3. A rotary electric machine according to claim 2, wherein the width of any of the innermost inductor teeth, the intermediate inductor teeth, and the outermost inductor teeth is different from the widths of the other inductor teeth.

4. A rotary electric machine according to claim 2, wherein the inductor teeth in the same pair are arranged symmetrically with respect to the center line of the main pole.

5. A rotary electric machine according to claim 2, wherein a value obtained by dividing a tooth width of each innermost inductor tooth by the first pitch, a value obtained by dividing a tooth width of each intermediate inductor tooth by the second pitch, and a value obtained by dividing a tooth width of each outermost inductor tooth by the third pitch are in a range from about 0.37 to about 0.39.

6. A rotary electric machine according to claim 1, wherein a distance between the rotor portion and any of the innermost inductor teeth, the intermediate inductor teeth, and the outermost inductor teeth is different from a distance between the rotor portion and the other inductor teeth.

7. A rotary electric machine according to claim 1, wherein the rotary electric machine is a hybrid type rotary electric machine.

8. A rotary electric machine according to claim 1, wherein a number of the plurality of main poles is eight.

9. A rotary electric machine according to claim 1, wherein a number of the inductor teeth in each of the main poles is six.

* * * * *